United States Patent [19]

Paul

[11] Patent Number: 5,280,084

[45] Date of Patent: Jan. 18, 1994

[54] PROCESS FOR IMPROVING THE HYDROPHILIC PROPERTIES ON POLYMER SURFACES

[75] Inventor: Swaraj Paul, Spanga, Sweden

[73] Assignee: PP Polymer AB, Sweden

[21] Appl. No.: 74,730

[22] PCT Filed: Apr. 10, 1989

[86] PCT No.: PCT/SE89/00187

§ 371 Date: Sep. 19, 1990

§ 102(e) Date: Sep. 19, 1990

[87] PCT Pub. No.: WO89/09795

PCT Pub. Date: Oct. 19, 1989

Related U.S. Application Data

[63] Continuation of Ser. No. 833,828, Feb. 13, 1992, abandoned, which is a continuation of Ser. No. 573,147, Sep. 19, 1990, abandoned.

[30] Foreign Application Priority Data

Apr. 12, 1988 [SE]  Sweden ................................. 8801347

[51] Int. Cl.$^5$ ............................. C08F 8/30; C08F 8/06
[52] U.S. Cl. ................................. 525/375; 427/299; 427/322; 428/409; 428/411.1; 428/500; 525/374; 528/424
[58] Field of Search ................ 525/374, 375; 528/424; 427/322; 428/500

[56] References Cited

U.S. PATENT DOCUMENTS

| | | | |
|---|---|---|---|
| 3,017,280 | 1/1962 | Yodelson | 525/375 |
| 4,060,664 | 10/1977 | McGuire | 428/336 |
| 4,167,414 | 9/1979 | Morgan | 430/532 |
| 4,181,528 | 1/1980 | Work, III | 428/474 |
| 4,241,169 | 12/1980 | Work, III | 430/532 |
| 4,418,164 | 11/1983 | Logullo, Sr. | 523/207 |
| 4,490,505 | 12/1984 | Pendergrass, Jr. | 524/591 |
| 5,057,371 | 10/1991 | Canty | 428/411.1 |

OTHER PUBLICATIONS

Canty et al., Chem. Abstracts, 107 (1987) #60201d.
Dialog Information Services, File 351, World Patent Index 81-89, Dialog Accession No. 85-102044/17, Shinto Paint KK: "Coating of Polyolefin Resin Mouldings by Plasma-Treating, Applying Compsn Contg. Free Isocyanate-Contg. Opds and Exposing to Amine Vapour", JP 60047035, A, 850314, 8517 (Basic).
Dialog Information Services, File 351, World Patent Index 81-89, Dialog Accession No. 82-27243E/14, Dainippon Ink Chem KK: "Organic Liq. Diffusion Resistant Polyolefin Containers Obtd. by Activating Container Surface Coating w/ Opd. Contg. . . . with Light" JP 57034950, A, 820225, 8214 (Basic).
Chemical Abstracts, vol. 107 (1987), Abstract No. 60201d, Eur. Pat. Appl. EP 206 669.
Chemical Abstract, vol. 103 (1985), Abstract No. 54909s, U.S. Pat. No. 4,490,505.
Chemical Abstracts, vol. 84 (1976), Abstract No. 5887p, Fr Demande 2, 246, 609.

Primary Examiner—Joseph L. Schofer
Assistant Examiner—Fred Zitomer
Attorney, Agent, or Firm—Larson and Taylor

[57] ABSTRACT

Polymer material is surface modified with the intention of increasing the hydrophilicity of the polymer surface, by producing carboxyl groups, carbonyl groups and hydroxyl groups on the polymer surface in a first stage, by oxidizing with, e.g., oxidizing acid solutions or in some other manner, and by reacting the groups on the polymer surface in a second step with heterocyclic compounds having three or four ring atoms or with isocyanate compounds or carbodiimide compounds.

6 Claims, No Drawings

PROCESS FOR IMPROVING THE HYDROPHILIC PROPERTIES ON POLYMER SURFACES

This application is a continuation of application Ser. No. 07/833,828 filed Feb. 13, 1993 now abandoned, which is a continuation of application Ser. No. 07/573,147 filed Sep. 19, 1990 now abandoned.

The present invention relates to a method for modifying the surfaces of polymeric materials. More specifically, the method is intended to increase the surface energy of polymer surfaces and therewith render hydrophobic polymeric materials hydrophilic.

An increase in the surface energy and hydrophilicity of synthetic resin surfaces and fiber surfaces comprising hydrophobic polymeric materials is a highly significant factor in the improvement of the properties of such materials with respect to gluing, adhesion, painting, dying, metallizing and printing.

Improvements in these properties have been decisive in meeting the expanding usage of polymeric materials in practical applications. Hitherto, the hydrophilicity of hydrophobic polymers has been increased by the following methods:

1. Oxidation with the aid of strongly oxidizing solutions.
2. Oxidation with the aid of physical-chemical methods, such as corona, flame and plasma treatment.
3. Grafting with hydrophilic monomers.

Known chemical oxidation methods may include the use of solutions of chromium oxides, permanganates and perchlorates in strong mineral acids. These chemical methods have resulted in a very marginal lowering of the contact angle used as a measurement of the surface energy of polymer surfaces. Furthermore, it is difficult to obtain reproduceable results on the contact angle when applying these methods. Most polymers have a low surface energy (19.1 mJM$^{-2}$ in the case of polytetrafluoroethylene; 30 to 33 in the case of polyethylene, and 47. mjm$^{-2}$ in the case of polyethylene terephthalate) which means that they exhibit a high contact angle at the air/water interface, in the order of 80°-95°, and cannot therefore be wetted readily with water.

A further drawback with the earlier published treatment methods is that that treatment is not stable and that the contact angle returns to its original values during the storage or use of such treated materials. Consequently, the effect of the treatment disappears with time and cannot therefore be used beneficially in practical contexts.

The improvement achieved in the hydrophilicity of polymer surfaces by the oxidative treatment of these surfaces is mainly due to the occurrence of polar groups on the polymer surfaces, mainly carboxyl, hydroxyl and carbonyl groups. The physical-chemical methods recited under point 2 above will generally result in the formation of similar groups on the polymer surfaces, and the limited success of these methods is due to the same reasons, namely an insufficient increase in surface energy and poor stability with regard to time.

The grafting methods referred to in point 3 above include a large number of known methods which although resulting generally in stable hydrophilicity, are expensive because of the complicated process apparatus required and the considerable monomer and catalyst input entailed. An additional drawback with graft copolymerization methods resides in the difficulties experienced in removing the simultaneously forming homopolymers, and in the very long extraction times required herefor.

The object of the present invention is to provide a method which will increase the surface energy and hydrophilicity of polymer surfaces, which will result in permanent hydrophilicity, and which because of the short treatment times and low chemical consumption entailed is suitable for industrial applications.

Accordingly this invention consists in a method which is mainly characterized by subjecting to oxidation in a first step, polymeric materials which include polyolefins, polystyrene, fluoroplastics, polyesters, polyacetals and polyacrylates, such as to produce on the polymer surfaces functional groups such as carboxyl, hydroxyl and carbonyl groups with the aid of known methods chosen from etching with oxidizing acid solutions, corona-treatment, plasma treatment and flashing treatment, and said first step also including the selection of polymerisation conditions in the manufacture of the polymeric material such that said functional groups will be incorporated in the polymer chains, and by bringing the resultant polymer surface in a second step into liquid contact with organic compounds which include heterocyclic compounds having three or four ring atoms, such as oxiranes, thiiranes, aziridines, azetidinones, oxetanes carbodiimides and isocyanates.

A fundamental concept of the development work lying behind the development of the inventive method is that the from a steric point of view readily mobile functional groups obtained with the known oxidation and etching processes will, in time, rotate inwardly in the bulk of the polymer, therewith explaining the subsequence diminishment of hydrophilicity, Accordingly, the next step in this development work was to find a suitable reagent which would bind these functional groups to new, larger groups of lower steric mobility. The choice of reagent opens further possibilities of increasing and regulating the extent to which the polymer surface is hydrophilized.

The reagents chosen for the inventive method step fulfill the requirements of being highly reactive, and therewith having short reaction times, and provide sterically stable groups of elevated hydrophilicity, in comparison with the non-reacted groups obtained with an oxidation treatment process.

Chemical oxidation of a polymer surface in accordance with step 1 can be effected with known, standard etching solutions, such as chromium trioxide, or a dichromate solution in water, or sulphuric acid, chromium trioxide dissolved in phosphoric acid and aqueous sulphuric acid, permanganate solution in sulphuric acid, peroxodisulphate solution in water, chlorate solution in perchloric acid, or by first etching with a chromium trioxide solution in sulphuric acid, followed by etching with concentrated nitric acid. The time taken to complete the etching process can vary between 5 seconds and 30 minutes and the process temperature may vary from room temperature to 100° C.

The choice of the etching method employed is, to some extent, related to the polymer to be treated, Olefin plastics are relatively inert and are preferably treated with a dichromate solution in sulphuric acid. Polystyrene, on the other hand, is liable to degrade in strongly oxidizing acid solutions, and consequently milder oxidizing processes should be employed. A suitable polystyrene oxidizing method is one in which polystyrene is treated with hydrogen peroxide in the presence of UV-light. Fluoroplastics are among those plastics which are least reactive chemically and therefore demand very harsh etching conditions, e.g. treatment with a solution of alkali metal in liquid ammonia.

Polyesters and polyacrylates are also liable to degrade in oxidizing acid solutions. However, an alternative method to step 1 is here proposed. Since polyesters are produced by the co-condensation of polyols and dicarboxy- lic acids, it is possible to obtain an excess of carboxyl and/or hydroxyl groups by controlled stoichiometric imbalance of the reactive components during co-condensation.

When producing polyacrylates, carboxyl and/or hydroxyl groups can be formed in the finished polymer, by adding monomers which contain hydroxyl and/or carboxyl groups to the polymerisation process. In other words, step 1 is carried out during the actual polymerisation process.

Oxidative treatment in step 1 using plasma, corona or flashing treatments can be effected on all types of polymer embraced by the invention. When plasma-etching, the material is exposed to a plasma which comprises a mixture of reactive substances, such as atoms, molecules and ions, in a metastable and/or excited state, and electrons. The mixture ratio of these reactive substances is such that a total balance prevails between positively and negatively charged particles.

Apparatus for corona or flashing treatment are available commercially, and these processes must be considered to be well established techniques in the present context.

In step 2, the polymer treated in accordance with step 1 is brought into contact with a solution which contains a compound belonging to the following groups A and B, wherein group A includes heterocyclic compounds having three or four ring atoms, such as oxiranes, thiiranes, aziridines, azetidinones and oxetanes, and group B includes carbodiimides and isocyanates. More specifically, the groups include the following compounds:

AI. Oxiranes

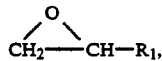

where $R_1$ is —$CH_2Hal$ or $CH_2OH$ and Hal is Cl, Br or I,

AII: Thiirane of the formula

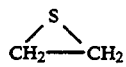

AIII: Mono- or multifunctional aziridenes of the formula

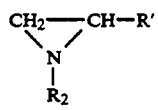

where R' may be hydrogen or an alkyl group having 1-10 carbon atoms and $R_2$ may be an alkyl group having 1-10 carbon atoms or an alkyl group having 1-10 carbon atoms which is substituted with one or two further aziridine groups, a melamine group in which one, two or three hydrogen atoms coupled to carbon atoms in the melamine ring are substituted with one or more aziridine groups or a P=O group.

AIV: Azetidinones of the formula

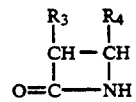

in which $R_3$ and $R_4$ include hydrogen, an alkyl group having 1-3 carbon atoms or an hydroxyl group.

AV: Oxetanes of the formula

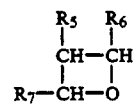

in which $R_5$, $R_6$ and $R_7$ include hydrogen, an alkyl group or an hydroxyl group.

BI: Isocyanates of the formula $R_8$—N=C=O, in which $R_8$ is an alkyl group having 1-10 carbon atoms, and toluene diisocyanate, alkylene diphenyl diisocyanates, isophorone diisocyanate, xylene diisocyanate and alkylene dicyclohexyl-diisocyanates.

BII: Carbodiimides of the formula $R_9$—N=C=N—$R_{10}$, in which $R_9$ and $R_{10}$ are each an alkyl group having 1-10 carbon atoms or a phenyl group which can be substituted with a halogen or hydroxyl.

The reaction according to step 2 is carried out in aprotic organic solvents, such as ketones and ethers. The treatment time is generally short and is from between 30 seconds and 30 minutes, preferably between 30 seconds and 3 minutes.

The temperature can be varied between room temperature and 100° C., preferably between room temperature and 60° C.

The reaction in step 2 between the polymers and compounds in group A takes place through ring-openings of the heterocyclic ring. Examples of such reactions are:

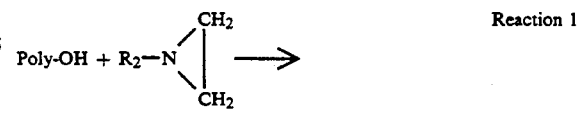

Reaction 1

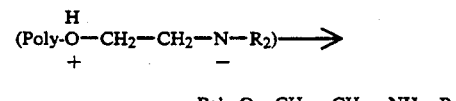

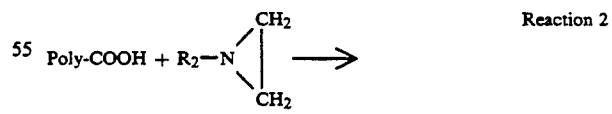

Reaction 2

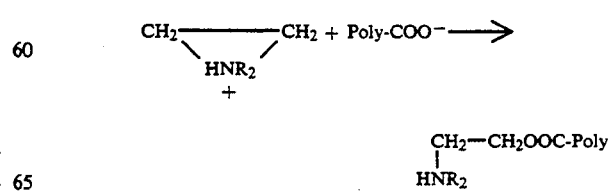

Examples of reactions with compounds in group B are:

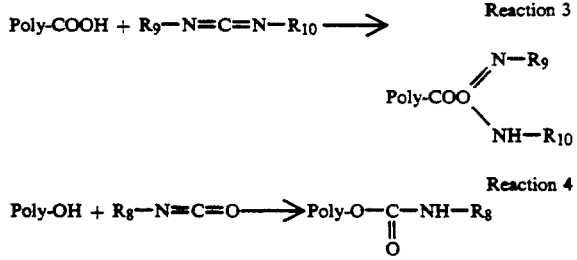

Reaction 3

Reaction 4

According to one preferred embodiment of the invention, the polymer obtained in step 1 is reacted in step 2 with a polyfunctional compound, i.e. a multi-ring heterocyclic compound chosen from group A, or, for instance, with a diisocyanate group from group B. The following compounds can be mentioned by way of example:

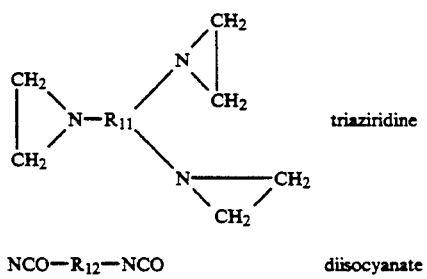

$NCO-R_{12}-NCO$        diisocyanate

In these instances, the non-reacted functional groups remaining on the polymer surface can be reacted in a third step with alcohols, polyols, monocarboxylic acids, or dicarboxylic acids for from 1 to 30 minutes at temperatures between room temperature and 100° C. Such unreacted groups will occur on the polymer surface when a polyfunctional compound is used to modify the polymer surface in step 2 above instead of a monofunctional compound. Since the concentration of —COOH, —OH and C=O-groups on the polymer surface is very low, it is probable that only one reactive group of the polyfunctional compound reacts with these groups, therewith leaving the other reactive groups for further reaction. This enables the polymer surface to be modified to various degrees of hydrophilicity.

In order to confirm that the presence of groups such as —COOH, —OH or C=O is necessary in order to hydrophilisize by reaction with the reactive compounds, all of the aforesaid polymer materials were treated with the various compounds described in step 2, without treating the polymer surface in accordance with step 1.

Measurement of the contact angles showed no changes in surface energy. The invention is further illustrated below with the aid of a number of working examples.

EXAMPLE 1

The contact angle on untreated polypropylene film was measured, after washing the film with acetone and drying it was found to be 91°–95°. The film was then treated with a dichromate solution in sulphuric acid (4.4% by weight dichromate in 15.7 molar of sulphuric acid) over periods of 30 sec, 1 min and 5 min at 20° C., and periods of 5 sec, 10 sec, 1 min and 5 min at 70° C., whereafter the film was washed clean with distilled water.

The contact angle at the air/water interface of the treated films was then measured, subsequent to having dried the films in an oven at 50° C. for three hours. The measured contact angles had values of 90±2°; 90 1,7°; and 94.6±2.2° at 20° C., and 92.4±3.2°; 95.7±2.4°; 100.4 4.8° and 105.6±3.3° at 70° C.

The film samples which were etched with the chromic acid solution for 30 sec, 1 min and 5 min at 20° C. and for 5 sec, 10 sec, 1 min and 5 min at 70° C. were then further treated with a trifunctional aziridine compound (Neocryl CX-100 ®), which compound prior to being used was first diluted with distilled water to a ratio of 1:1 at room temperature (RT) for 30–40 seconds, and was then washed was distilled water for 1 minute, with methanol for 30 secds, with acetone for 30 sec and finally again with distilled water for 3 mins, whereafter the film was dried in the above manner. The contact angle of these modified surfaces was then measured and the following values were obtained: 64.9±1.5°; 77±2.2° and 71,9±2.7° at 20° C. etched films, and 70±1.9°; 68±1.9°; 70,8±1.1° and 76.7 1.8° at 70° C. etched films. In order to confirm that the treatment gave a permanent effect, the first of above-mentioned films was boiled in distilled water for 5 hours and then dried. The contact angle was then measured as 67.8±5.3°.

The contact angle on washed polypropylene film subsequent to treatment with Neocryl CX-100 without etching was found to be 98.4±2.4°.

EXAMPLE 2

The film was treated with a dichromate solution in sulphuric acid, but this time with 2.8 percent by weight dichromate in 15.77 molar of sulphuric acid for 30 sec, 1 min and 5 min at 20° C. and for 5 sec, 10 sec, 1 min and 5 min at 70° C, whereafter the films were washed clean with distilled water. The films were then dried in an oven for three hours at 50° C, whereafter the water-/air contact angle of the films was measured and the following values obtained: 83.4±2.9°; 84.8±2,9° and 83.5±2.2° at 20° C., and 84.8±1.9°; 85.3±2.6°; 93.1±2.4° and 95.4±1.5° at 70° C. The film samples were then further treated with a trifunctional aziridine compound (Neocryl CX-100), which prior to being used was diluted with distilled water to a ratio of 1:1 at room temperature for 30–40 sec and then washed with distilled water for 1 minute, with methanol for 30 sec, with acetone for 30 sec and finally again with distilled water for 3 min, and then dried as above. The contact angle of these modified surfaces was then measured and the following values obtained: 71.0±1.7°; 72.2±1.7° and 73.3±1.4° at 20° C. etched films, and 70.5±1.5°; 72.3±1.0° and 75±0.7° at 70° C. etched films. It is clearly seen that etching with the weaker dichromate solution results in a slightly lower contact angle than when etching with the stronger etching solution of Example 1.

EXAMPLE 3

The films were first treated with dichromate solution in sulphuric acid (4.4 percent by weight dichromate in 15.7 molar sulphuric acid) for periods of 30 sec, 1 min and 5 min at 20° C., whereafter the films were washed clean with distilled water. These films were then further treated with 70%-nitric acid at 50° C. for 15 min, and then washed with distilled water. The treated films were then dried in an oven at 50° C., whereafter the water/air contact angle of the treated films was measured, resulting in the following values: 83±1.8°; 89.3±2.9° and 79.3±3.4°. The etched films were then further treated with a trifunctional aziridine compound (Neocryl CX-100) which was used, after being diluted with distilled water to a ratio of 1:1, at room temperature for 30–40 sec and then washed with distilled water for 1 minute, with methanol for 30 sec, with acetone for 30 sec and finally again with dis-tilled water for 30 min, whereafter the films were dried in the aforedescribed manner.

The contact angle was then measured again, resulting in values of 69.8±2.9°; 81.1±1.9° and 73.9±2.9°. In order to check the stability of the treated surfaces, the first of the aforementioned films was boiled in boiling water for five hours and the contact angle then measured on dry film. A contact angle of 71.5±3.1° was obtained. It will be seen from the results that compared with Examples 1 and 2 additional etching with nitric acid affords no appreciable improvements.

EXAMPLE 4

The film etched in accordance with Example 2 for 30 sec at 20° C. and treated with Neocryl CX-100 was after-treated for 1 min with distilled water, for 1 min with methanol and for 1 min with acetone at room temperature, whereafter the contact angle was measured to be 66.8±2.8°. This film was then further treated with boiling distilled water for two hours and the contact angle was measured and found to be 56.6±0.9°. In comparison with Example 2, it will be seen that the longer aftertreatment resulted in a lower contact angle.

Thus, a still lower contact angle was obtained in comparison with Example 2, which is probably due to the effect of a third step, i.e. non-reacted functional groups from the trifunctional aziridine reacted further with water.

EXAMPLE 5

The film etched in accordance with Example 2 for 30 sec at 20° C. and treated with Neocryl CX-100 was after-treated for 1 min with distilled water and 1 min and 5 min with acetic acid at room temperature and at pH=3. Contact angles of 80.8±1.5° and 81.2±0.7° were obtained. The treatment with acetic acid definitely gave no improvement.

EXAMPLE 6

The film etched in accordance with Example 2 for 30 sec at 20° C. and treated with Neocryl CX-100 was after-treated for 1 min with distilled water and then for 1 min and 5 min respectively with lactic acid at pH=3 at room temperature and at a temperature of 55° C. The following results were obtained:

1 min 75.5±2.4° at room temperature; 73.2±2.1° at 55° C.

5 min 68.5±1.5° at RT; 71.7±1.7° at 55° C.

The lower contact angle in comparison with Example 5 is probably due to the presence of a hydroxyl group in the lactic acid molecule.

EXAMPLE 7

The film etched according to Example 2 for 30 sec at 20° C. and treated with Neocryl CX-100 was aftertreated for 1 min with distilled water and then for 5 min with malonic acid at pH=3 at RT and at 55° C. respectively. Contact angle values of 83.9±0.9° and 70.8±2.3° respectively were obtained.

The improved result, compared with Example 5, is probably because malonic acid has two carboxyl groups whereas acetic acid has only one carboxyl group.

EXAMPLE 8

The film etched according to Example 2 for 30 sec at 20° C. and treated with Neocryl CX-100 was aftertreated for 1 min with distilled water and then for 5 min with a sodium hydroxide solution at pH=10 at RT and at 55° C. respectively. Contact angle values of 59.6±2.7° and 63.4±0.8° respectively were obtained.

EXAMPLE 9

Since water reacts with the aziridine rings, a 1:1 mixture of CX-100 with waterfree acetone was used to treat etched polypropene film according to Example 2 for 30 sec at room temperature. The etched film was then after-treated for 1 min in with distilled water, 1 min with methanol and 1 min with acetone at room temperature. The contact angle was measured and found to be 58.4±0.9°.

The absence of water during the treatment with the aziridine compound according to step 2 would seem to be preferable.

EXAMPLE 10

Instead of polypropylene film, PP-yarn was first etched with chromic acid according to Example 2 for 30 sec, and then treated with 1:1 CX-100 solution in water-free acetone at room temperature for 30 sec, and then after-treated with methanol for 1–5 min. Since the contact angle method cannot be used to prove the surface modifying effect on yarn, an alternative method was used. Two yarn samples of mutually the same lengths, the one untreated and the other surface treated in accordance with the afore-going, were immersed in respective water basin and the time taken for the first water droplet to leave the basins was taken as a measurement of the surface treatment effect. The results were 4 min for the treated yarn as against 10.5 min for the non-treated yarn, measured under equal conditions. The surface modification effect was also confirmed, by measuring the flow rate through the yarn when used as a stopper in the end of a funnel. The through-flow rate in the case of the treated yarn was much slower than that of the untreated yarn, showing that the wetting power of the yarn had been considerably improved by the surface modification.

EXAMPLE 11

PP-film was first etched with a chromic acid solution according to Example 2 for 30 sec at RT and then treated with a carbodiimide compound (UCARLNK XL-25 SE ®) for 30 sec at room temperature. The film was then after-treated with methanol for 1 min and finally with acetone for 1 min. The contact angle of the modified film was measured and found to be 74.4±1°.

EXAMPLE 12

The PP-film etched in accordance with Example 11 and treated with carbodiimide was after-treated for 1 min with distilled water and for 5 min with methanol, whereafter the contact angle was measured and found to be 72.2±1.8°. Since UCARLNK XL-25 SE is monofunctional, no further lower of the contact angle is achieved by extending the after-treatment process. In order to check that a permanent surface modification had been achieved, the modified sample was boiled for 2 hours in boiling acetone. The contact angle was measured and found to be 71.0±0.9°, i.e. the angle was unchanged.

EXAMPLE 13

PP-film was first etched with chromic acid solution according to Example 2 for 30 sec at RT and then treated with an isocyanate compound (Estane PBA 2103 ®) for 30 sec at RT. The treated film was then washed with acetone for 30 sec and 1 min respectively and the contact angle measured. The values obtained were 80.2±1.3° and 78.2±0.5° respectively.

EXAMPLE 14

Polyethylene film (PE) of very high crystallinity (Lupolen 3741 BX ®) was first washed clean with acetone and then dried, whereafter the contact angle was measured and found to be 92.3±1.2°. The cleanly washed film was then treated with dichromate solution in sulphuric acid (2.8 percent by weight dichromate in 15.77 molar of sulphuric acid) for periods of 30 sec, 1 min and 5 min at 20° C. and 70° C. respectively, and then washed clean with distilled water. The water/air contact angle was then measured on the treated films, subsequent to having dried the films in an oven at 50° C. for 3 hours. The measured contact angle values were 80.4±2.0°; 71.9±6.2° and 82.1±0.9° at 20° C. and 86.7±1.9°; 85.4±3.2°, and 90.8±1.2° at 70° C. The etched films were then further treated with a trifunctional aziridine compound (Neocryl CX-100) subsequent to dilution with acetone to a 1:1 ratio at room temperature for 30-40 sec and then washed with distilled water for 1 min, with methanol for 1 min, with acetone for 1 min and finally again with distilled water for 3 min, whereafter the films were dried in accordance with the aforegoing. The contact angle of these modified surface was again measured and found to be 57.3±3.0°; 63.4±1.0° and 61.1±5.1° in the case of film etched at 20° C., and 69.3±3.4°; 74.2±2.1° and 59.8±3.4° in the case of films etched at 70° C.

EXAMPLE 15

A PE-sample treated with a CX-100 for 30 sec as in Example 14 was after-treated with methanol for 1 min. The contact angle was found to be 58.2±2.7°. For the purpose of determining whether or not the treatment gave a permanent effect, the modified sample was boiled in acetone for 3 hours. The contact angle remained unchanged, i.e. 57.2±0.7°.

EXAMPLE 16

The PE-film was etched in accordance with Example 14 for 30 sec and 1 min respectively and then treated with a carbodiimide (UCARLNK XL-25 SE) for 30 sec at RT and then after-treated with distilled water for 1 min, with methanol for 1 min and with acetone for 1 min at RT. The film was then dried and the contact angle measured, this angle being found to be 67.1±1.1° and 70.2±2.1°.

EXAMPLE 17

Polyester plastics produced by condensation polymerisation need not be surface oxidized in accordance with the methods before mentioned with respect to step 1, since OH-groups or COOH-groups can be obtained by adjusting the OH/COOH-ratio during the resin manufacture.

A film sample of a polyethylene terephthalate (Mylar ®) was washed clean and the contact angle measured to be 71.2±2.2°. The film was then treated with an aziridine compound (CX-100) for 30 sec at 20° and at 50° C. respectively and then washed with methanol for 1 min, with acetone for 1 min and finally again with distilled water for 3 min, and then dried in accordance with the aforegoing. The contact angle was again measured and found to be 56±1.7° and 57.7±1°. The test showed that step 2 according to the invention can be applied directly for surface modifying co-polymers when the presence of OH—, COOH—and C=O-groups can be produced on the polymer surface with the aid of known copolymerization techniques.

EXAMPLE 18

Polytetrafluoroethylene (Algoflon ®) was first washed clean with acetone and then dried, whereafter the contact angle was measured and found to be 120.9±9.8°. The cleanly washed film was then treated with a dichromate solution in sulphuric acid (2.8 percent by weight dichromate in 15.77 molar sulphuric acid) for 30 sec and 5 min at 20° C. and 70° C. respectively, whereafter the film was washed in distilled water. The water/air contact angle was then measured on the treated films, subsequent to drying the film in an oven at 50° C. for 3 hours. Measurement of the contact angles resulted in values of 113.2±4.8° and 122.9±1.8° at 20° C. and 118.2±3.8° and 119.1±1.5° at 70° C. The etched film samples were then further treated with a trifunctional aziridine compound (Neocryl CX-100) which was used after dilution with acetone for a ration of 1:1 at room temperature for 30-40 sec and then washed with distilled water for 1 min with methanol, for 1 min with acetone and finally again with distilled water for 3 in, whereafter the film was washed in accordance with the aforegoing. The contact angle of these modified surfaces was then measured and found to be 105.3±1.6° and 114.3±0.8° at 20° C. and 116.2±2.6° and 116.5±1.1° at 70° C.

EXAMPLE 19

Polystyrene material (PS) was also treated in accordance with the invention. Since PS is highly sensitive to strong oxidizing agents, the desired groups, such as —OH, —COOH or C=O on the polymer surface were obtained by photooxidation under UV-light for 60-90 sec in the presence of $H_2O_2$. The irradiated films were then further treated with a trifunctional aziridine compound (Neocryl CX-100), subsequent to dilution with acetone to a ratio of 1:1 at room temperature for 30-40 sec and then washed with distilled water for 1 min, with methanol for 1 min, with acetone for 1 min and finally again with distilled water for 3 min, and then dried in accordance with the above. The contact angle of the PS-films was measured both before and after surface modification, and a lowering of the contact angle from 75.3±2.2° to 63.2±1.2° was obtained.

EXAMPLE 20

PP-film was plasma treated in a plasma reactor (plasma-prep. 100 , Nanotech). The film samples were placed in the reactor, which was then evacuated to 1 torr. Oxygen gas was then streamed through the reactor at a flow rate of 20 ml/min.

The film samples were then exposed to 100 W plasma for 1 min at 60° C.

Subsequent to plasma etching, contact angles of between 91° and 67° were measured on different film samples, i.e. a wide spread was obtained over the measured contact angle values. Some of the plasma etched films were then further treated with a trifunctional aziridine compound (Neocryl XZ-100) which was used after dilution with acetone to a ratio of 1:1 at room temperature for 30-40 sec and then washed with distilled water for 1 min, with methanol for 1 min, with acetone for 1 min and finally again with distilled water for 3 min, and then dried in accordance with the aforegoing. The contact angle of PP-films which after the plasma etching process had a mean contact angle of 85.5° was measured to be 63.3±0.4°, i.e. the contact angle had been lowered by the surface treatment. In order to check whether or not the surface treatment effects were permanent, the surface modified films were stored in air for some weeks and the contact angle values then measured. The contact angle value of solely plasma etched film returned to the original value, i.e. about 90°, whereas the films which were treated with aziridine compound subsequent to the plasma etching process retained a contact angle value of about 60°. This again confirms that surface treatment according to the invention provides a permanent effect and that —OH, —COOH and C=O-groups can be provided on the polymer surface in step 1 by means of alternative methods.

EXAMPLE 21

PP-film similar to that used in Example 20 was oxidized by means of a corona treatment. This corona treatment of the film involved exposing the film to ionized air generated by applying a high voltage between two electrodes. A corona power of 2.5 kW was used.

The contact angle of film samples subjected to this corona treatment was then measured and found to be on average 83.1±1.2°. There was no spread in the contact angle values obtained in this particular case. Some of the corona-treated films were then further treated with a trifunctional aziridine compound (Neocryl CX-100) in accordance with step 2, which was used after diluting with acetone to a ratio of 1:1 at room temperature for 30-40 sec and then washed with distilled water for 1 min, with methanol for 1 min, with acetone for 1 min and finally again with distilled water for 3 min, and then dried in accordance with the aforegoing. The contact angle of the treated PP-films was measured and found to be 64.1±0.4°, i.e. the surface treatment had lowered the contact angle. For the purpose of checking whether or not the surface treatment effects were permanent, the contact angle values of the surface modified films were measured after storing the films for some weeks in air. The contact angle value of the films solely corona treated returned to their original value, i.e. about 90°, which is the contact angle value of PP-film prior to the corona treatment, whereas the films which had been treated with aziridine compound (CX-100) after the corona treatment retained a contact angle value of about 60°. This again confirms that surface treatment in accordance with the invention provides a permanent effect and that alternative methods, of the type corona treatment, can also be used to produce OH—, COOH—C=O-groups on the polymer surface.

EXAMPLE 22

Instead of aziridine, isocyanate and carbodiimide compounds, the PP-films were also treated with epichlorohydrin, thiirane, azetidinone ($\beta$-lactam) and oxetane (4-methyloxetane-2-on) in step 2. The PP-films used in step 2 were treated in a dichromate solution according to Example 2 for 30 sec at room temperature and the contact angle was measured. The contact angle on PP-films treated with chromic acid were found to be between 82° and 85°, whereas this contact angle decreased to 72°-75° subsequent to chemical treatment. Although the effects obtained were not as pronounced as those obtained with trifunctional aziridine compound (CX-100), they were nevertheless quite noticeable. A check was again run in order to ascertain whether the effects were permanent or not, by boiling the treated material in water and acetone respectively. No change was noticed in the contact angle values, which again showed that the effects were permanent.

EXAMPLE 23

A polyacetal (Delrin ®) was treated with chromic acid solution in accordance with Example 2 for 30 sec in step 1 and then with aziridine compound (CX-100) for 30 sec at RT in step 2. The treated films were then further treated with methanol for 1 min and with acetone for 1 min at RT whereafter the films were dried in accordance with the aforegoing and the contact angle measured. A lowering in the contact angle of about 12°-° wa obtained.

EXAMPLE 24

An acrylate polymer was produced by solution polymerisation of methyl methacrylate, hydroxyethylarylate, and acrylic acid in a mol ratio of 0.90:0.07:0.03 in the presence of N,N'-bis-azo(isobutyronitrile) as initiator at 60° C. This copolymer contained OH—and COOH-groups per se.

The acrylate polymer produced was reacted directly with an aziridine compound (CX-100) for 30 sec at RT in accordance with step 2. The treated films were then further treated with methanol for 1 min and with acetone for 1 min at RT and were then dried in accordance with the aforegoing, whereafter the contact angle were measured. A lowering of the contact angle of 13.4° on average was obtained.

I claim:

1. A method for increasing the hydrophilic properties of polymer surfaces of polyolefin materials, characterized by subjecting the polyolefin material to an oxidative treatment in a first step to provide functional groups on the polymer surface, said functional groups being chemically reactable with mono- and polyfunctional aziridines and carbodiimides; and contacting immediately after said oxidation treatment in a second step the thus obtained polymer surface with a solution of an organic compound, said organic compound being selected from the mono- or polyfunctional aziridines and carbodiimides, and in a third step, followed immediately after said second step without any drying and coating formation of said organic compound onto the polymer surface, washing the polymer surface with one or more solvents to remove every excess of said organic compound from the polymer surface.

2. A method according to claim 1, wherein the functional groups are selected from the group consisting of carboxyl groups, hydroxyl groups and carbonyl groups.

3. A method according to claim 1, wherein the polyolefin material is etched with an oxidizing acid solution in said first step.

4. A method according to claim 1 wherein the polymer material in said second step is treated with a polyfunctional aziridine compound.

5. A method according to claim 4 wherein the polymer surface is treated simultaneously with or directly after said third step with one or more compounds containing nucleophilic groups which react with still unreacted aziridine rings by opening said rings, said compound being selected from the group consisting of alcohols, water, amines, carboxylic acids, amino acids, hydroxycarboxylic acids and inorganic hydroxides.

6. A method according to claim 1, wherein the polymer material is treated with a carbodiimide compound in said second step.

* * * * *